United States Patent
Buschmann et al.

(10) Patent No.: US 9,487,160 B2
(45) Date of Patent: Nov. 8, 2016

(54) SEALED DEVICE FOR A CAMERA

(71) Applicant: Huf Hülsbeck & Fürst GmbH & Co. KG, Velbert (DE)

(72) Inventors: Gerd Buschmann, Velbert (DE); Heiko Schütz, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 14/434,213

(22) PCT Filed: Oct. 10, 2013

(86) PCT No.: PCT/EP2013/071226
§ 371 (c)(1),
(2) Date: Apr. 8, 2015

(87) PCT Pub. No.: WO2014/057070
PCT Pub. Date: Apr. 17, 2014

(65) Prior Publication Data
US 2015/0274090 A1   Oct. 1, 2015

(30) Foreign Application Priority Data

Oct. 10, 2012  (DE) .................. 10 2012 109 661

(51) Int. Cl.
*H04N 5/225* (2006.01)
*B60R 11/04* (2006.01)
*B60R 11/00* (2006.01)

(52) U.S. Cl.
CPC ............ *B60R 11/04* (2013.01); *H04N 5/225* (2013.01); *H04N 5/2251* (2013.01); *H04N 5/2252* (2013.01); *B60R 2011/004* (2013.01)

(58) Field of Classification Search
CPC .. H04N 5/225; H04N 5/2251; H04N 5/2252; B60R 11/04
See application file for complete search history.

(56) References Cited

U.S. PATENT DOCUMENTS

| | | | | |
|---|---|---|---|---|
| 5,878,295 A * | 3/1999 | Katagiri | ............... | G03B 17/045 396/341 |
| 2003/0011904 A1 * | 1/2003 | Chiu | ........................ | G02B 7/02 359/823 |

(Continued)

FOREIGN PATENT DOCUMENTS

DE   102009008281         8/2010
DE   102009008281 A1 *   8/2010   ............. B60R 11/04

(Continued)

OTHER PUBLICATIONS

International Search Report and the Written Opinion Dated Dec. 11, 2013 From the European Patent Office Re. Application No. PCT/EP2013/071226 and Its Translation Into English.

(Continued)

*Primary Examiner* — Abdelaaziz Tissire

(57) ABSTRACT

The invention relates to a device (10) with a carrier element (11) on which a camera unit (12), which serves for acquiring images in the exterior region of a motor vehicle, is arranged, and with at least one drive mechanism (14) for the camera unit (12), said drive mechanism serving to move the camera unit (12) to and fro between an inoperative position (1a) and an image acquisition position (Ib), wherein the drive mechanism (14) is arranged on the carrier element (11) in order to hold the camera unit (12) movably, and wherein the carrier element (11) has an opening (11.1) on the front side, through which images can be acquired at least in the image acquisition position (Ib) for the camera unit (12), and with at least one gap (11.2) on the front side between the opening (11.1) on the front side in the carrier element (11) and the camera unit (12) in order to be able to transfer the camera unit (12) into the image acquisition position (Ib). The invention is likewise directed towards a method for actuating the device according to the invention.

19 Claims, 3 Drawing Sheets

(56) References Cited

U.S. PATENT DOCUMENTS

| | | | | |
|---|---|---|---|---|
| 2003/0098908 A1* | 5/2003 | Misaiji | B60R 1/00 348/148 |
| 2007/0024740 A1* | 2/2007 | Strong | G03B 5/06 348/360 |
| 2009/0231430 A1* | 9/2009 | Buschmann | B60Q 1/0023 348/148 |
| 2009/0296240 A1* | 12/2009 | Franz | G02B 7/008 359/820 |
| 2010/0081880 A1* | 4/2010 | Widenhouse | A61B 17/3462 600/201 |
| 2012/0070142 A1* | 3/2012 | Tregnago | B60R 1/0605 396/419 |
| 2012/0293656 A1* | 11/2012 | Schutz | B60R 11/04 348/148 |
| 2014/0085467 A1* | 3/2014 | Barthel | B60R 11/04 348/148 |

FOREIGN PATENT DOCUMENTS

| | | | |
|---|---|---|---|
| DE | 102009060425 | 6/2011 | |
| DE | 102010001196 | 7/2011 | |
| DE | 102010045214 | 3/2012 | |
| DE | 102011000683 | 8/2012 | |
| DE | 102011000684 | 8/2012 | |
| DE | WO 2012107547 A1 * | 8/2012 | B60R 11/04 |
| DE | 102012017422 A1 * | 3/2014 | B60R 11/04 |
| WO | WO 2014/057070 | 4/2014 | |

OTHER PUBLICATIONS

Notification of Office Action and Search Report Dated Mar. 14, 2016 From the State Intellectual Property Office of the People's Republic of China Re. Application No. 201380053905.9 and Its Translation of Office Action Into English.

\* cited by examiner

SEALED DEVICE FOR A CAMERA

RELATED APPLICATIONS

This application is a National Phase of PCT Patent Application No. PCT/EP2013/071226 having International filing date of Oct. 10, 2013, which claims the benefit of priority of German Patent Application No. 10 2012 109 661.9 filed on Oct. 10, 2012. The contents of the above applications are all incorporated by reference as if fully set forth herein in their entirety.

FIELD AND BACKGROUND OF THE INVENTION

The invention relates to a device with a carrier element at which a camera unit is assembled which serves for acquiring images of the exterior area of the vehicle according to the preamble of claim 1. This device comprises at least a drive mechanism for the camera which serves for moving the camera back and forth between a rest position and an image acquisition position, wherein the drive mechanism is assembled at the carrier element in order to keep the camera movable. Further, the carrier element comprises an opening at the front side through which images can be acquired by the camera unit at least in the image acquisition position. Further, at least a gap is intended at the front side between the opening at the front side in the carrier element and the camera unit in order to transfer the camera unit into the image acquisition position. Through this gap the camera unit can extend out of the opening on the front side or can at least perform the image acquisition. Further, the invention is also related to a method for the actuation of a device with a carrier element at which a camera unit is assembled, which serves for the image acquisition of the exterior area of a vehicle according to the preamble of claim 17.

From the state of the art devices for moving a camera unit are significantly known. From document EP 1 529 688 B1 further such a device for moving a camera unit is disclosed with a sealed rest position and also an image acquisition position of the camera unit, in order to avoid that dirt can penetrate through the opening at the front side through which the camera unit performs the image acquisition. However, it has turned out that simply in an intermediate position of the camera unit between the rest position and the image acquisition position contaminations can still penetrate into the inside of the device, since for example the camera unit is also moved back and forth during reversing between the rest position and the image acquisition position.

Further it is known from the state of the art to seal the rearward area of the camera unit so that no moisture can rearwardly reach the camera unit. In document WO 2011/085745 A1 such a device for adjusting of a camera unit is known by which the rearward area is correspondingly sealed.

SUMMARY OF THE INVENTION

It is the objection of the present invention to provide a device and an actuation procedure for such a device which avoids the disadvantages from the state of the art. Particularly it is the objection of the present invention to avoid contaminations as much as possible which penetrate into the device from the front.

This device is solved according to the invention by a device with the features of the independent claim 1, particularly from the characterizing clause. Likewise for the solution of the objection a method for the actuation of a device with a carrier element is proposed, at which a camera unit is assembled with the features of claim 17, particularly from the characterizing clause. In the dependent device and method claims preferred embodiments of the invention are specified. Features which are disclosed regarding the device according to the invention apply thereby also for the actuation method according to the invention and vice versa. Further, the method according to the invention from claim 17 can be realized with a device according to the invention for a camera unit.

The device according to the invention comprises a camera unit which is directly or indirectly assembled via a slide at the carrier element, particularly with an adapter. The camera unit can be moved back and forth between the rest position and the image acquisition position within the device via a drive mechanism. Advantageously, the drive mechanism is assembled directly or even indirectly at the carrier element. The carrier element comprises an opening at the front side through which images can be acquired at least in the image acquisition position for the camera unit. In the image acquisition position at least a gap at the front side is intended between the opening in the front side in the carrier element and the camera unit, since otherwise the camera unit could not perform image acquisition. It is not absolutely necessary that the camera unit is assembled with its objective in the opening of the front side when the image acquisition position is achieved. Rather, the camera unit can stop a bit behind the opening at the front side and acquire the desired images. According to the invention it is intended that the gap at the front side is closable by a sealing element.

Thereby, the intended sealing element can seal the gap at the front side between the complete back and forth movement of the camera unit between the rest position and the image acquisition position. Therewith, it is not possible that contaminations can penetrate in the rearward area of the carrier element or the device according to the invention. Therewith also the complete drive mechanism can be completely protected, which normally is assembled behind the opening at the front side at the carrier element.

In order to exchangeably assemble the camera unit in the device according to the invention, it can be assembled at a slide, which processes an adapter, in order to therewith enable an easy exchange. The adapter can therefore comprise a bayonet catch, a clamping catch or a screw catch. Normally, the camera unit is assembled at the slide via a form and/or force fit with the help of the adapter. The slide is then again connected with the drive mechanism in order to be able to move the camera back and forth. Naturally, it is also possible within the scope of the invention that the drive mechanism directly interacts with the camera unit. In this case, a slide with the optional intended adapter is resigned.

Like further emerging from the dependent claims the sealing element according to the invention can be variously configured. Thus, a closed membrane can be intended with the sealing element. A different sealing element is configured bristle-like and comprises sealing bristles, which are assembled in the gap at the front side between the carrier element and the camera unit. With another sealing element a rubber-like cover is used which is clamped by a spring element in the gap at the front side between the carrier element and the camera unit.

Optional embodiments of the device according to the invention are subsequently further described in detail.

With the device according to the invention it can be intended that the sealing element is assembled at the carrier element or at the camera unit. Further it is possible that the sealing element is assembled at the carrier element in the area of the gap at the front side and at the camera unit in the front area. Through a bilateral assembly of the sealing element it is achieved that the gap at the front side is closed by the sealing element the whole time, namely in each position of the camera unit between the rest position and the image acquisition position. Therewith, it is ensured that no contaminations from the outside can penetrate through the opening at the front side into the device.

In order to particularly easily mount the sealing element and, if necessary, exchange the sealing element, it can be intended that at the carrier element and/or at the camera unit a clamping flange is intended for the sealing element. Herewith, the connecting flange can be configured as a section-wise planar area. Further it is possible that the connecting flange can be intended as a notch and/or a recess, so that quasi a labyrinth-seal is configured in the area of the connecting flange.

Advantageously, it can be intended with a device according to the invention that the sealing element is assembled via resting means at the carrier element and/or at the camera. These resting means can be assembled in one piece to the sealing element. However, it is possible that the resting means perform a separate component to the sealing element. Further it is possible that at least a connecting flange serves for the assembly through a resting means at the camera unit and/or the carrier element. The resting means itself can also be performed by the sealing means if this is, for example, configured elastic and therewith can generate a pretension, which for example interacts with a connecting flange at the camera unit and/or the carrier element.

With the invention it can be optionally intended that the resting means comprises a support element at the carrier element, particularly in form of a support frame. Herewith the sealing means can be clamped between the carrier element and the support frame. Like previously described it is likewise possible that the support frame is for example assembled at the carrier element or at the sealing element in order to create a reliable connection between the carrier element and the sealing element. The support element can also be configured as a separate component which, for example, can be brought into connection via a screwing or a clamping or a welding with the carrier element and/or the sealing element. Advantageously, the form of the support frame as a support element is adapted to the geometric configuration of the opening at the front side of the carrier element. Herewith however, the support frame does not need to continuously interact with the carrier element but can also only sectionally or punctionally press the sealing element to the carrier element.

Further, it is possible with the device according to the invention that the resting means at the camera unit is configured as a clamping element, particularly as a clamping ring or clamping wire. Just this clamping element can be an integral part of the sealing element. The clamping element itself can comprise elastic material like for example rubber, silicon or spring wire.

It is further possible within the scope of the invention that the sealing element is assembled directly or via the resting means indirectly at the carrier element or at the camera unit. Herewith, the sealing element can be connected or assembled with the carrier element and/or the camera unit in an adhesive or force fitting manner. With this particular embodiment of the device according to the invention the sealing element is adhesively connected at the carrier element and also at the camera unit. For this purpose the sealing element can comprise a protection membrane.

Therefore, it is also possible within the scope of the invention that the sealing element comprises a protection membrane which is particularly highly flexible and particularly comprises a pre-formed basic form. By the protection membrane it is enabled that the sealing element can be firmly connected directly or indirectly at the carrier element and also directly or indirectly at the camera unit. The movements of the camera unit between its rest position and the image acquisition position are taken in by the formability of the protection membrane. Advantageously, the protection membrane comprises a thin layer, particularly from plastic, silicon or rubber in order to reliable shield dirt from the outside of the device according to the invention. The material of the protection membrane can also be configured semi-permeable and for example tissue- or fabric-like. Thus, for example a breathable, but water proof fabric layer can be used as a protection membrane. The sealing element itself is at least partially or even completely configured from the protection membrane.

With the device according to the invention it is further possible that the sealing element, particularly in form of the protection membrane, comprises at least an extension means. Through this extension means it can be achieved that regarding a non-extendable sealing element a movement is possible anyway. However, the sealing element itself can also be configured from an extensible and elastic material. With this movably, but not necessarily elastically configured sealing element the extension means can be realized for example by folding or covering. Naturally, these folding or coverings can also be available with an elastic extension element. Therewith it can be avoided that the camera unit between the rest position and the image acquisition position must be moved against the tension force of the sealing element during an elastic formation.

Likewise it is possible within the scope of the device according to the invention that the sealing means is configured bristle-like. Herewith single bristles can be assembled as close to one another so that they completely close the gap at the front side. For this purpose it is advantageous when multiple bristles are assembled next to each other and thereby perform a certain sealing width for the sealing means. The advantage of the bristle-like sealing element can be seen by the fact that the sealing element has to be only assembled at one side at the camera unit or at the carrier element. Naturally, also this bristle-like sealing element can be assembled directly or indirectly, for example via resting means at the carrier element and/or at the camera unit.

With a particular elegant embodiment of the device according to the invention it can be intended that the carrier element comprises a movement passage for the camera unit in which the camera unit is received. Herewith, the camera unit is assembled in a mainly equal distance to the inside of the movement passage between the rest position and the image acquisition position. In this movement passage the camera unit is therewith guided through the movement passage quasi parallel towards the inner walls. Advantageously, also the bristle-like sealing element can be assembled in this movement passage, which completely seals the gap at the front side towards the opening at the front side. The movement passage ideally ends with the opening at the front side or exactly forms this opening at the front side. By the use of the movement passage it can be achieved that the bristles of the bristle-like sealing element are quasi not rammed, since an equal distance between the camera unit and the movement passage exists.

Within the scope of the invention it is further possible that the bristle-like sealing element is assembled at the camera unit and the single bristles interact with their free edges with the carrier element or the inner walls of the movement passage. Therewith also an easy exchange of the bristle-like sealing element is possible, which can be directly performed when the camera unit is removed from the remaining device. In this case the bristle-like sealing element can be easily exchanged or cleaned. However, it is also possible within the scope of the invention that the bristle-like sealing element is solidly assembled at the carrier element or at the inside of the movement passage and interacts with its free edges with the camera unit. Further, herewith it is about a kinematic reversion of the previously described assembly of the bristle-like sealing element. Ideally, with the second assembly of the bristle-like sealing element at the carrier element or at the inner wall of the movement passage this is assembled at the area at the opening of the front side, and thereby likewise an easy exchange is enabled.

It is further possible with the device according to the invention that the sealing element is configured bellow-like. Hereby at least a spring element can be assembled in the bellow-like sealing element in a way, that the bellow-like sealing element is flexibly clamped in the gap at the front side and seals the gap. Thereby, the bellow-like sealing element is quasi put over the spring element and seals the gap at the front side. Further, the bellow-like sealing element can be directly or indirectly be assembled or mounted at the camera unit or at the carrier element via resting means.

Further it is possible within the scope of the invention that the bellow-like sealing element is assembled at the carrier element and the spring elements press the bellow-like sealing element at the camera unit, particularly in a rubber-like cover. Also a kinematic reverse of the assembly of the bellow-like sealing element is possible, since this can be directly or indirectly assembled at the camera unit and can directly or indirectly interact with the carrier element. Likewise with this embodiment of the invention the previously described movement passage can be intended for the camera unit.

In order to additionally protect the device in its rest position from the penetration of contaminations, it can be intended that in front of the opening of the front side of the carrier element a lid element is assembled which closes the opening at the front side at least in the rest position of the camera unit. This lid element can be assembled with the device, particularly the carrier element, via a swivel or pivoting joint. Ideally, the lid element is automatically opened during the adjustment of the camera unit from the rest position into the image acquisition position. Likewise it is advantageous that the lid element automatically closes the opening at the front side when the camera unit is moved from the image acquisition position into the rest position. For this purpose for example a connection means can be intended between the camera unit and the lid element. Additionally, a second sealing means particularly in form of a sealing ring can be assembled between the lid element and the further device.

Further, it is possible that the drive mechanism and/or the previously described lid element can be moved back and forth at least by a drive particularly in form of an electric motor. This drive can be assembled within the device according to the invention or can be intended at the rearward area of the device. Hereby, it is advantageous when the drive interacts with the drive mechanism and/or the camera unit as well as possibly with the lid element via the connecting element.

Further, it is possible with a device according to the invention that the carrier element is configured at least partially as a housing or in a housing. Hereby, at least one housing opening, particularly as a ventilation opening, can be intended in the rear area of the housing. Also another housing opening, for example as a dewatering opening, can be intended if despite the intended sealing arrangements moisture can penetrate into the device according to the invention, for example through the rearward area.

Like previously described the invention is also directed to the method according to claim 17. Hereby it is intended according to the invention that the camera unit is moved back and forth between the rest position and the image acquisition position towards the gap at the front side permanently sealed.

BRIEF DESCRIPTION OF THE DRAWINGS

According to the invention the features of the description and the claims and the device according to the invention and the method according to the invention can be essential for the invention each single for themselves or in different combinations. Further measures improving the invention are subsequently described together with the description of the preferred embodiments of the invention by means of the figures. It is shown:

For equal technical features and also for different embodiments identical reference signs are used in the figures.

DESCRIPTION OF SPECIFIC EMBODIMENTS OF THE INVENTION

Figure 1A:
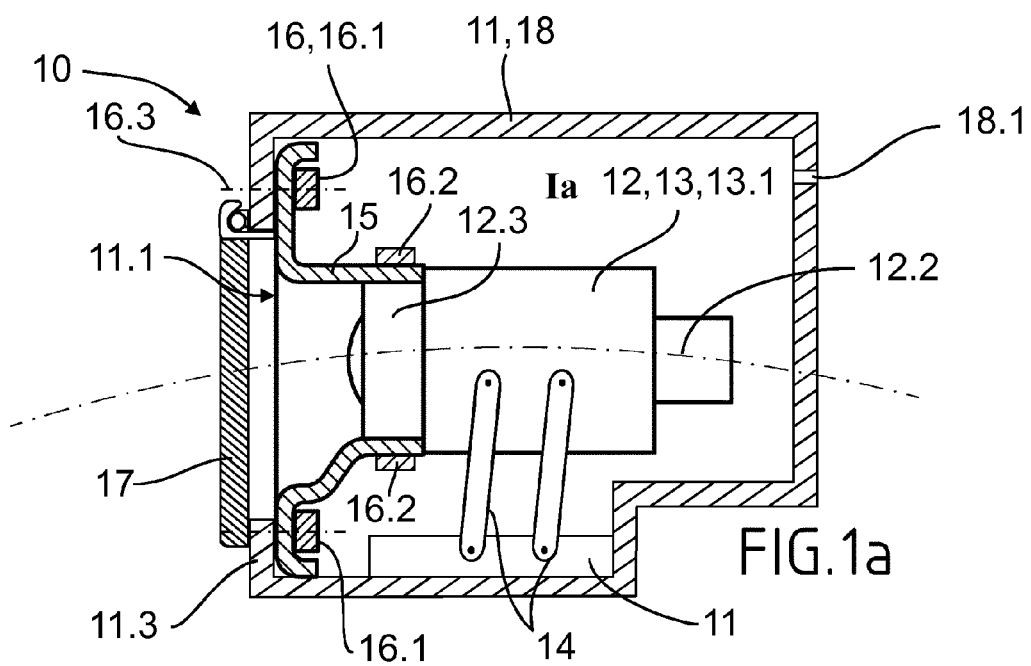
FIG. 1*a* a schematic longitudinal cut through the device according to the invention in a rest position of the camera unit, FIG. 1*b* a comparable cross section through the device according to the invention in an image acquisition position of the camera unit wherein essential features of the device are removed, FIG. 2*a* front view of the device according to the invention with an opening at the front side and a gap at the front side between the carrier element and the camera unit, FIG. 3*a* a three-dimensional view of the sealing element according to the invention which is configured as a protection membrane, FIG. 3*b* a longitudinal cut through the sealing element from FIG. 3*a*, FIG. 4 a schematic longitudinal cut through a further device according to the invention with a bristle-like sealing element, FIG. 5*a* a schematic longitudinal cut through another device according to the invention with an elastic sealing element which comprises a rubber-like cover, and FIG. 5*b* a detailed longitudinal cut through the corresponding sealing element from FIG. 5*a*.

In FIG. 1*a* a schematic longitudinal cut is shown through the device 10 according to the invention in a rest position Ia of a camera unit 12. In this rest position Ia the camera unit 12 is assembled completely behind the opening 11.1 at the front side of the carrier element 11. The carrier element 11 is in the present case configured as a housing 18 and almost protects the camera unit 12 on the rear side against contaminations. In order to avoid pressure alterations through a movement of the camera unit 12 within the housing 18, it for example a housing opening 18.1, particularly as a ventilation opening, is intended. In order to transfer the camera unit 12 from its shown rest position Ia (see FIG. 1*a*) into the image acquisition position Ib, a drive mechanism 14 is intended which in the present case comprises two parallely and pivotably mounted levers. This drive mechanism 14 can be assembled directly at the carrier element 11 or for example at a drive which is however not shown. Through the pivoting of both parallel levers of the drive mechanism 14 the camera unit 12 is moved from the rest position Ia along an arch-like guidance line 12.2 in the image acquisition position Ib.

The camera unit 12 itself is assembled at a slide 13, which comprises an adapter 13.1 for the assembly of the camera unit 12. Through this adapter 13.1 also different models of camera units 12 can be inserted unproblematic into the device 10 according to the invention. Through the adapter 13.1 the camera unit 12 is normally connected with the slide 13 in a form fitting and/or force fitting manner. Like recognizable in FIG. 1a the drive mechanism 14 affects the slide 13, in order to therewith indirectly move the camera unit 12. The guidance line 12.2 of the camera unit is shown with a dotted line in FIGS. 1a and 1b. On this guidance line 12.2 the camera unit 12 moves from its rest position Ia into the image acquisition position Ib and vice versa.

For an additional protection of the device 10 according to the invention a lid element 17 is intended in front of the opening 11.1 at the front side of the carrier element 11. This lid element 17 is opened and closed via a not shown connecting element. This connecting element can for example be directly or indirectly connected to the camera unit 12 or with a drive mechanism 14 or a drive. In the image acquisition position Ib the lid element 17 is at least opened that far that the camera unit 12 can begin with the image acquisition without limitations. In FIG. 1a the lid element 17 is mounted to the carrier element 11 via a swivel joint with a steady pivoting axis.

Figure 1B:
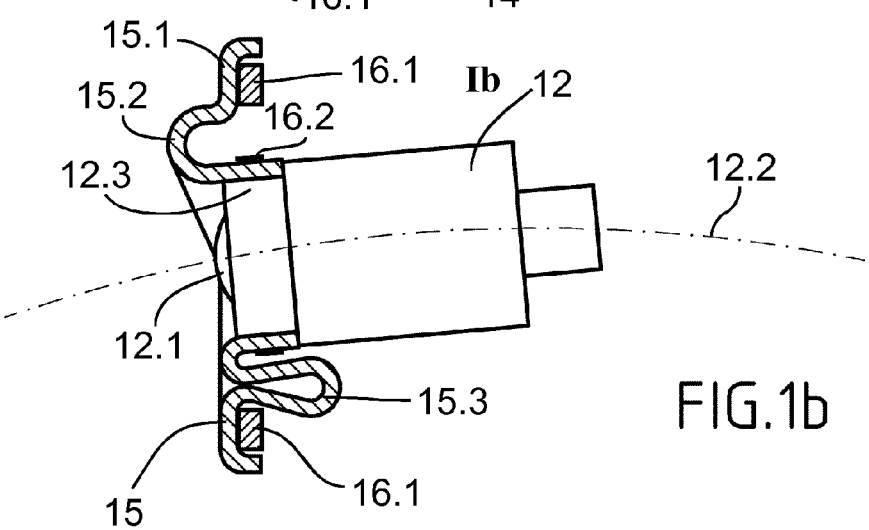

In order to conduct a sealing of the opening 11.1 on the front side of the device 10 according to the invention a sealing element 15 is intended. This sealing element 15 comprises a protection membrane 15.1 in FIG. 1a, which is configured flexible and particularly rubber-like. In order to, on the one hand assemble the sealing element 15 at the carrier element 11, and on the other hand at the camera unit 12, additional resting means 16 are possible. In FIG. 1a the resting means 16 is configured for the assembly at the carrier element 11 as a support element 16.1, particularly support frame 16.1. Herewith the sealing element 15 is assembled with a flange 15.4 between the carrier element 11, particularly a therefore intended assembly flange 11.3, and the support element 16.1, particularly in form of a support frame, through for example fixing means 16.3 in form of screws. Further, the sealing element 15 is assembled at the camera unit 12 with its flange 15.5 particularly the therefore intended assembly flange 12.3. Herewith, likewise a resting means 16 can be used which is shown in FIGS. 1a and 1b as a clamping ring 16.2 or a clamping wire. With both flanges 15.4 and 15.5 of the sealing elements 15 the sealing element 15 is clamped between the resting means 16 and the camera unit 12 on the one hand or the carrier element 11 on the other hand. The support frame-like support element 16.1 for the carrier element 11 can be additionally fixed by fixing means 16.3, particularly in form of screws, blanks or such like with the carrier element 11. The clamping ring or clamping wire 16.2 clamps the flange 16.5 from the sealing element 15 to the assembly flange 12.3 of the camera unit 12. Therewith it is ensured that the present sealing element 15 completely seals the opening 11.1 at the front side of the carrier element 11 in each position of the camera unit 12.

In the further FIG. 1b a similar longitudinal cut through the device 10 according to the invention is shown in the image acquisition position Ib of the camera unit 12. Herewith, further technical features, particularly the carrier element 11 and the drive mechanism 14, are consciously removed. In this image acquisition position Ib the camera unit extends at least partially through the opening 11.1 on the front side of the carrier element 11. Thereby, the camera unit 12 can completely determine the desired pictures with its objective 12.1. From FIG. 1b it is also shown how the form of the sealing element 15 alters between the rest position Ia and the image acquisition position Ib. Herewith it is sufficient that the sealing element 15 is deformable, but does not necessarily need to be configured elastic. Especially in the lower area of the sealing element 15 a conscious folding 15.3 is performed since the assembly flange 12.3 of the camera unit 12 in the image acquisition position Ib significantly approaches to the assembly flange 11.3 at the carrier element 11. For this purpose, the sealing element 15 can be specifically formed, which is described in more detail in FIGS. 3a and 3b.

Figure 2:
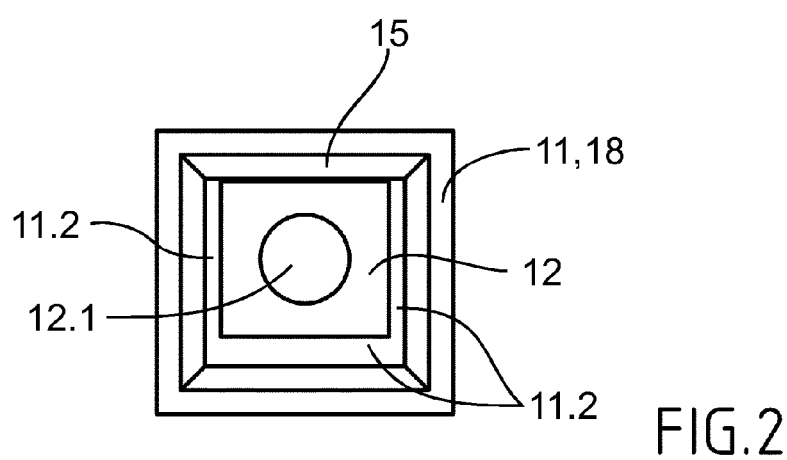

In FIG. 2 a front view of the device 10 according to the invention is shown with an opening 11 at the front side and an opening 11.2 at the front side and a gap 11.2 at the front side between the carrier element 11 and the camera unit 12. Like it can be recognized from FIG. 2 the distance of the gap 11.2 at the front side between the opening 11.1 at the front side of the carrier element 11 and the camera unit 12 does not necessarily be configured equal to all sides. Further, the present invention is not restricted to a rectangular opening 11.1 at the front side. Also the housing of the camera unit 12 does not necessarily be rectangular but can also be performed round or differently. However, it is then recommended to also adapt the form of the sealing element 15 to the geometric form of the opening 11.1 at the front side on the one hand at to the geometric form of the camera unit 12 on the other hand.

Figure 3A:
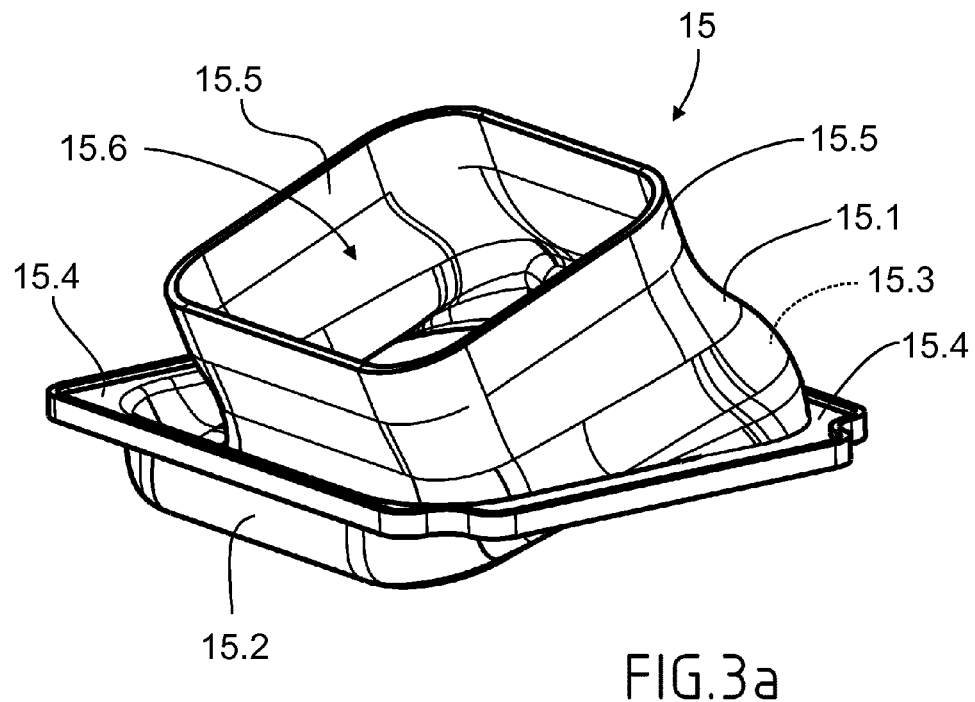
Figure 3B:
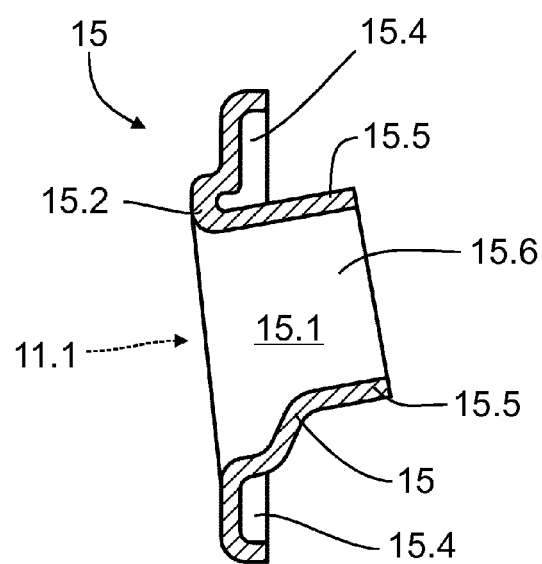

In FIGS. 3a and 3b only the sealing element 15 is shown. This sealing element 15 comprises a protection membrane 15.1 which can particularly be configured rubber-like. In FIG. 3a, a three dimensional view of the sealing element 15 is shown which mainly corresponds to the image acquisition position Ib from the camera unit 12. In FIG. 3a, both flanges 15.4 and 15.5 for the carrier element 11 and the camera unit 12 are clearly recognizable. Thereby, the sealing element 15 comprises only one opening 15.6 through which the camera unit 12 is guided through and assembled, particularly with its assembly flange 12.3. The cross section of the flange 15.5 is mainly rectangular with rounded corners and corresponds therewith to the outer extend of the assembly flange 12.3 of the camera unit 12. This assembly flange 15.4 of the sealing element 15 rests plane on the assembly flange 12.3. In order to securely fix the sealing element 15 to the camera unit 12, additionally a resting element 16 can be intended in form of a clamping means 16.2 (see FIGS. 1a and 1b). However, it is also possible that the sealing element 15 is elastically expansible in the area of the flange 15.5 as far as the flange 15.5 itself abuts sealingly at the assembly flange 12.3 of the camera unit 12. In the area of the flange 15.4 additionally a circumferential upstand is intended, which serves for the acceptance and positioning of the resting means 16, particularly in form of a support frame 16.1 for the assembly at the carrier element 11. The sealing element 15 comprises extension means 15.2 and folding 15.3 between both flanges 15.4 and 15.5 in order to preferably avoid an elastic deforming of the sealing element 15 through the movement from the rest position Ia into the image acquisition position Ib. Like previously described the sealing element can also be performed tissue or textile-like wherein it can also be a semi-permeable protecting membrane 15.1.

For a better illustration in FIG. 3*b* a longitudinal cut through the sealing element 15 from FIG. 3*a* is shown. Thereby also the circumferential upstand for the positioning of the support frame-like resting means 16 in the area of the flange 15.4 of the sealing element 15 is clearly recognizable. Also the upper extension means 15.2 and the lower folding 15.3 is clearly recognizable.

Figure 4:
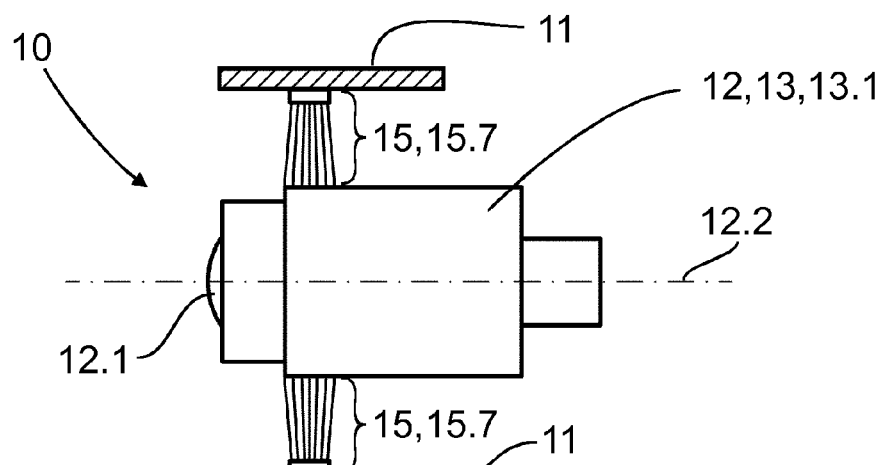
Figure 5A:
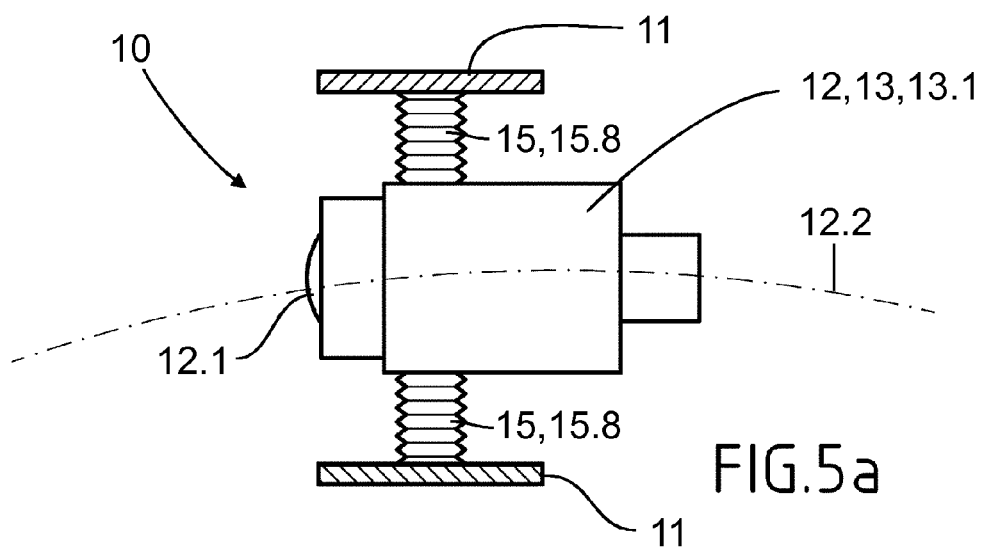
Figure 5B:
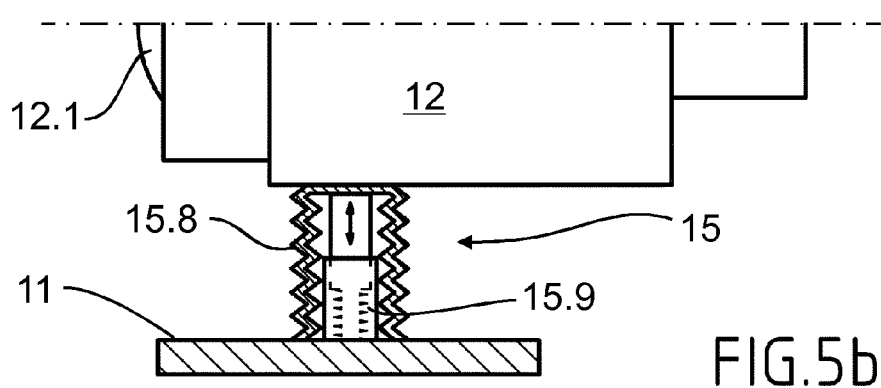

In the further FIGS. 4 and 5*a*, 5*b* further embodiments of the device 10 according to the invention or the corresponding sealings are shown. In FIG. 4, a bristle-like configuration of a sealing element 15.7 is used. Thereby, the bristles 15.7 are assembled in the gap 11.2 on the front side between the carrier element 11 and the camera unit 12 and thereby seal the gap 11.2. Due to the flexibility of the bristles 15.7 the camera unit 12 can be moved back and forth along a (straight lined) guidance line 12.2, wherein the bristles slide with their free edges along the outer side of the camera unit 12. Hereby, further a secure sealing of the gap 11.2 at the front side is ensured. In FIG. 4, the case is shown that the bristle-like sealing element 15 is only assembled at the carrier element 11. However, it is also possible that the bristle-like sealing element 15.7 is only assembled at the camera unit 12, particularly at the assembly flange 12.3 or the slide 13 and the bristles with their free edges interact with the gap 12.2 at the front side of the sealing element 11.

In FIGS. 5*a* and 5*b* a bellow-like sealing element 15.8 is used in order to seal the gap 11.2 at the front side. A correct assembly of the corresponding sealing element 15 is shown in detail in FIG. 5*b*. The advantage with the bellow-like sealing element 15.8 in contrast to the bristle-like sealing element 15.7 from FIG. 4 is, that also the size of the gap 11.2 can be (punctual) altered since the length or the height of the bellow-like sealing element 15.8 can be likewise (punctual) altered. Due to this reason the camera unit 12 can also follow an arch-like guidance line 12.2 without leading to leakages in the gap 11.2 at the front side since the bellow-like sealing element 15.8 flexibly adjusts to the particular size of the gap 11.2 at the front side.

Like it can be recognized in FIG. 5*b* the bellow-like sealing element 15.8 comprises a particularly rubber-like cover wherein within the cover a longitudinally shifting spring element 15.9 is assembled. This spring element 15.9 sealingly presses the cover to the outer area of the camera unit 12. In the present embodiment from FIG. 5*b* the sealing element 15.8 is assembled at the carrier element 11 and slides its free edge along at the outer side of the camera unit 12. Naturally, here also a kinematic reversion is possible, so that the corresponding sealing element 15.8 is assembled at the camera unit 12, particularly at the assembly flange 12.3, and interacts with its free edge with the carrier element 11, particularly the gap 11.2, at the front side.

REFERENCE LIST

10 Device
11 Carrier element
11.1 Opening at the front side
11.2 Gap at the front side
11.3 Assembly flange
12 Camera unit
12.1 Objective
12.2 Guidance line
12.3 Assembly flange
13 Slide
13.1 Adapter for 12
14 Drive mechanism
15 Sealing element
15.1 Protection membrane, particularly rubber-like
15.2 Extension means
15.3 Folding
15.4 Flange for 11.3
15.5 Flange for 12.3
15.6 Opening for 12
15.7 bristle-like sealing element, particularly with bristles
15.8 bellow-like sealing element, particularly with rubber-like cover
15.9 Spring element
16 Resting means
16.1 Support element, particularly support frame
16.2 Clamping ring or clamping wire
16.3 Fixing means, particularly screw, blank or such like
17 Lid element
18 Housing
18.1 Housing opening, particularly ventilation opening
Ia Rest position
Ib Image acquisition position

The invention claimed is:

1. Device with a carrier element, on which a camera unit is assembled which serves for the image acquisition of the outer area of a vehicle, and
with at least a drive mechanism for the camera unit which serves for moving the camera back and forth between a rest position and an image acquisition position,
wherein the drive mechanism is assembled at the carrier element in order to keep the camera unit movable, and
a sealing element including a first end and a second end, wherein the first end is fixedly connected to the carrier element and the second end is fixedly connected to the camera unit and wherein the sealing element is configured to seal a gap between the camera unit and an opening at a front side of the carrier element,
wherein the gap extends between the rest position and acquisition position;
wherein the carrier element comprises the opening at the front side, through which at least in the image acquisition position images are recordable for the camera unit and with at least a gap at the front side between the opening at the front side in the carrier element and the camera unit in order to transfer the camera unit into the image acquisition position,
wherein
the gap at the front side is closable through the sealing element.

2. Device according to claim 1,
wherein
the sealing element is on the one hand assembled at the carrier element and on the other hand at the camera unit.

3. Device according to claim 2,
wherein
the sealing element is assembled at the carrier element in the area of the gap at the front side and at the camera unit in the frontal area.

4. Device according to claim 1,
wherein
at the carrier element or at the camera unit an assembly flange for the sealing element is intended, wherein the assembly flange is configured as a section-wise plane area, as a notch or recess.

5. Device according to claim 4,
wherein
the sealing element can be assembled via resting means at the carrier element or at the camera unit wherein the assembly flange serves for the assembly by the resting means.

6. Device according to claim 5,
wherein
the resting means comprise a support element at the carrier element, and the sealing element is clamped between the carrier element and a support frame.

7. Device according to claim 5,
wherein
the resting means is configured as a clamping element at the camera unit, as a clamping ring or clamping wire.

8. Device according to claim 1,
wherein
the sealing element comprises a protection membrane which is highly flexible and comprises a pre-formed basic form.

9. Device according to claim 1,
wherein
the sealing element comprises at least one extension means.

10. Device according to claim 1,
wherein
the sealing element is configured bristle-like and the single bristles completely close the gap at the front side.

11. Device according to claim 1,
wherein
the carrier element comprises a movement passage for the camera unit in which the camera unit is received and the camera unit comprises a mainly constant distance to the inner wall of the movement passage between the rest position and the image acquisition position.

12. Device according to claim 1,
wherein
a bristle-like sealing element is assembled at the camera unit and the single bristles interact with their free edges with the inner wall of the movement passage.

13. Device according to claim 1,
wherein
a bristle-like sealing element is assembled at the carrier element and with its free edges interacts with the camera unit.

14. Device according to claim 1,
wherein
the sealing element is configured bellow-like and at least one spring element is assembled within the bellow-like sealing element in a way that the bellow-like sealing element is flexibly clamped in the gap at the front side and seals the same.

15. Device according to claim 14,
wherein
the bellow-like sealing element is assembled with the spring elements at the carrier element and the spring elements press the bellow-like sealing element, to the camera unit.

16. Device according to claim 1,
wherein
in front of the opening of the front side of the carrier element a lid element is assembled, which at least in the rest position of the camera unit closes the opening at the front side.

17. Device according to claim 1,
wherein
the carrier element is at least partially configured as a housing or in a housing.

18. Device according to claim 17,
wherein
in a rear area of the housing a housing opening is intended as a ventilation opening.

19. Method for the actuation of a device with a carrier element at which a camera unit is assembled which serves for the image acquisition of the outer area of a vehicle,
and with at least one drive mechanism for the camera unit which serves for moving the camera unit back and forth between a rest position and an image acquisition position,
wherein the drive mechanism is assembled at the carrier element in order to keep the camera unit movable, and
wherein the carrier element comprises an opening at the front side with a gap at the front side through which at least in the image acquisition position images are recordable for the camera unit and
with at least a gap at the front side between the opening at the front side in the carrier element and the camera unit in order to transfer the camera unit into the image acquisition position, wherein the gap extends between the rest position and the acquisition position; and
a sealing element including a first end and a second end, wherein the first end is fixedly connected to the carrier element and the second end is fixedly connected to the camera unit and wherein the sealing element is configured to seal the gap between the camera unit and the opening at a front side of the carrier element;
wherein
the camera unit is moved back and forth between the rest position and the image acquisition position.

* * * * *